United States Patent [19]
Kliest

[11] Patent Number: 5,806,902
[45] Date of Patent: Sep. 15, 1998

[54] GRIP FOR ROPE MANIPULATION

[76] Inventor: William R. Kliest, 27W047 Parkway Dr., Winfield, Ill. 60190

[21] Appl. No.: 631,635

[22] Filed: Dec. 18, 1996

[51] Int. Cl.⁶ .................................................. F16G 11/04
[52] U.S. Cl. ......................... 294/1.1; 24/136 R; 294/19.1
[58] Field of Search .................................. 294/1.1, 19.1, 294/22, 58; 16/110 R, 111 R, 114 R, 114 B; 24/115 R, 115 G, 136 R; 81/487; 188/65.1

[56] References Cited

U.S. PATENT DOCUMENTS

| | | | |
|---|---|---|---|
| 1,944,603 | 1/1934 | Hecker | 188/65.1 |
| 2,448,384 | 8/1948 | Meinzinger | 294/1.1 |
| 3,312,128 | 4/1967 | Wasson | 294/1.1 |

*Primary Examiner*—Johnny D. Cherry

[57] ABSTRACT

This grip in it's unique design enhances the manipulation of resilient or rope like material in such fields of endeavor as Pruning. Prior to its creation, rope has to be wrapped around a user's hand or knotted around a wood handle to obtain enough tension to activate the cutting blade on the pruner. In the former procedure, the rope could escape from the user's hand and in the latter the wood handle might not be in the right position for a comfortable process. The grip moves along the length with ease as the pole is extended or contracted and with a simple wrist movement and finger pressure locks the rope instantly and places the grip in a position for using the maximum tension possible by the user.

2 Claims, 3 Drawing Sheets

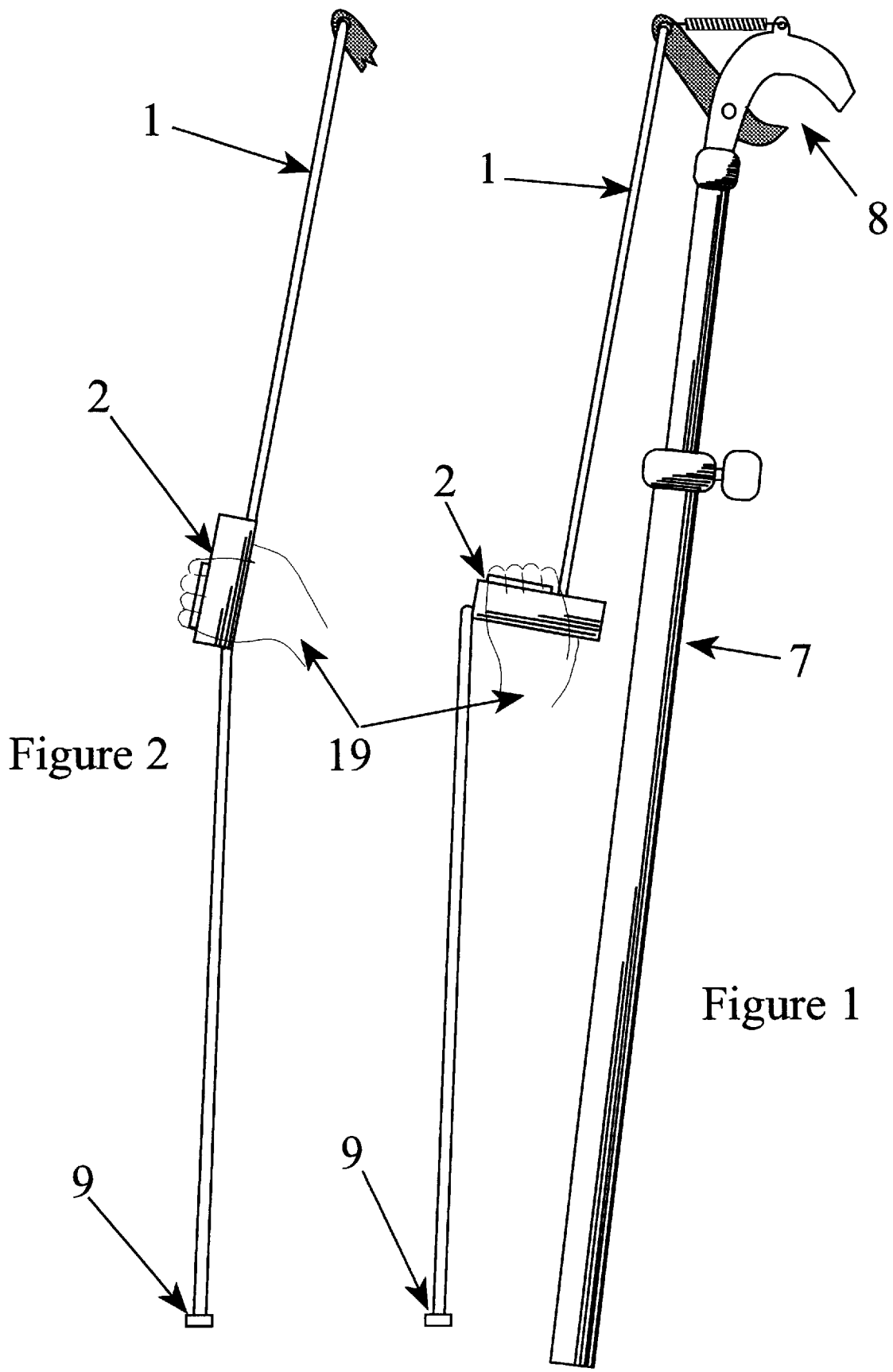

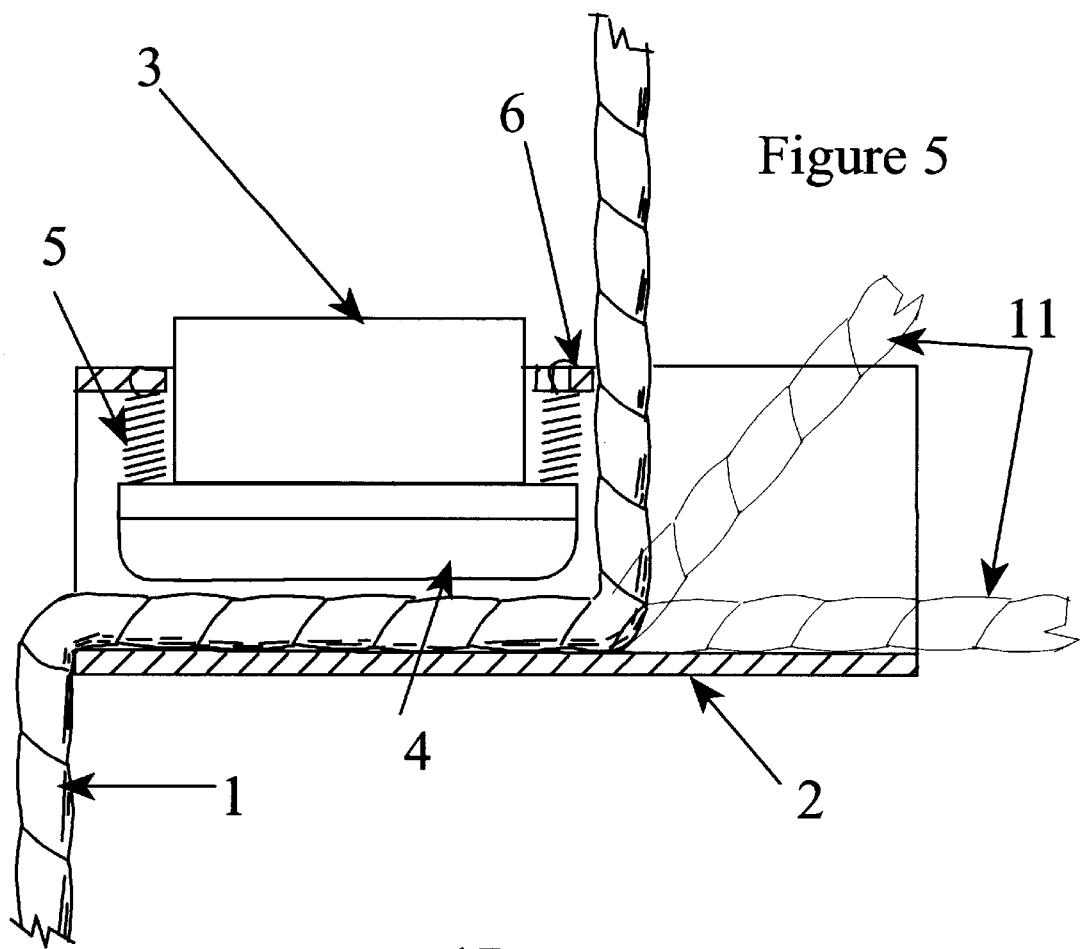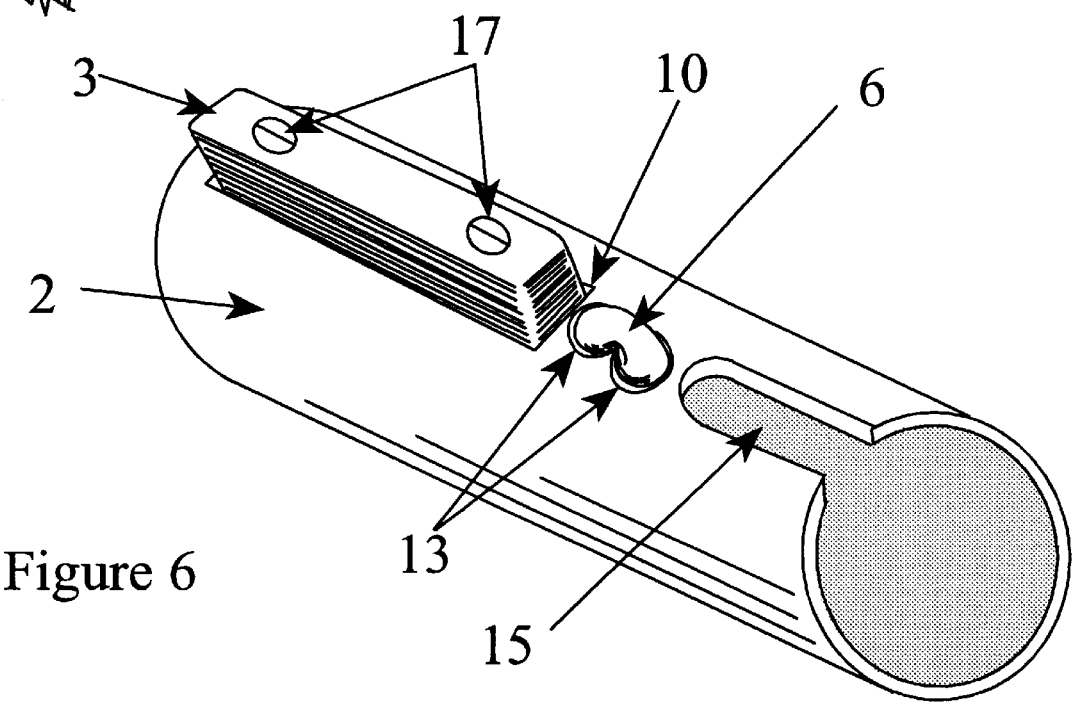

GRIP FOR ROPE MANIPULATION

CROSS-REFERENCE TO RELATED APPLICATIONS

None

State as to Right to Invention Make Under Federally-Sponsored Research and Developments None

BACKGROUND OF INVENTION (1) Field of Invention.

This grip is one of many styles in the category of brakes or hand grips. It was designed to be used with equipment such as, but not limited to, tree pruners.

(2) Background Art

The purpose of my invention is to allow the user to prune trees without the rope becoming entangled around the users hand or cause discomfort to the user's hand by the encirclement of the rope. Prior to it's creation, the rope attached to the pruner head had to be wrapped around the users hand to obtain the necessary tension in a short arm movement to activate the cutter head. When the user moves the head to a different location, some distance from the original position, the rope has to be regrasped at a new location and rewrapped around the hand. A short piece of cylindrical wood with a hole through the cross section was devised and added to such equipment to eliminate the problem, but, it was limiting in that it did move freely along the length of the rope, giving some control to the rope, but, it is necessary to wrap the rope around the handle several times overlapping the rope to obtain a locking of the rope. This can be a difficult one-handed procedure requiring great dexterity or relying on the hand holding the pole for assistance which is time consuming and inconvenient. The conventional, longitudinal movement, style grips require long distance arm movements, an uncomfortable wrist action or total brake locking action which is dependent on the pressure of the hand on the brake and not a combination of pressure and frictional angle locking as in my invention.

SUMMARY

The purpose of the invention is to allow the user to prune trees without the rope becoming entangled around users hand. This alleviates discomfort or possible injury to user's hand. User would not have to wrap rope around user's hand to prune higher or lower branches. The idea is to allow user to position handle in any location on rope allowing user to prune at different heights or locations.

BRIEF DESCRIPTION OF THE DRAWINGS

To elaborate upon the invention:

FIG. 1 depicts a pruner with the grip in an active mode.

FIG. 2 depicts a pruner with the grip in a passive mode.

FIG. 5 depicts a working simulation of the friction angle locking procedure.

FIG. 6 is a 45 degree plan view of the grip.

DESCRIPTION OF THE PREFERRED EMBODIMENTS

Figure 3:
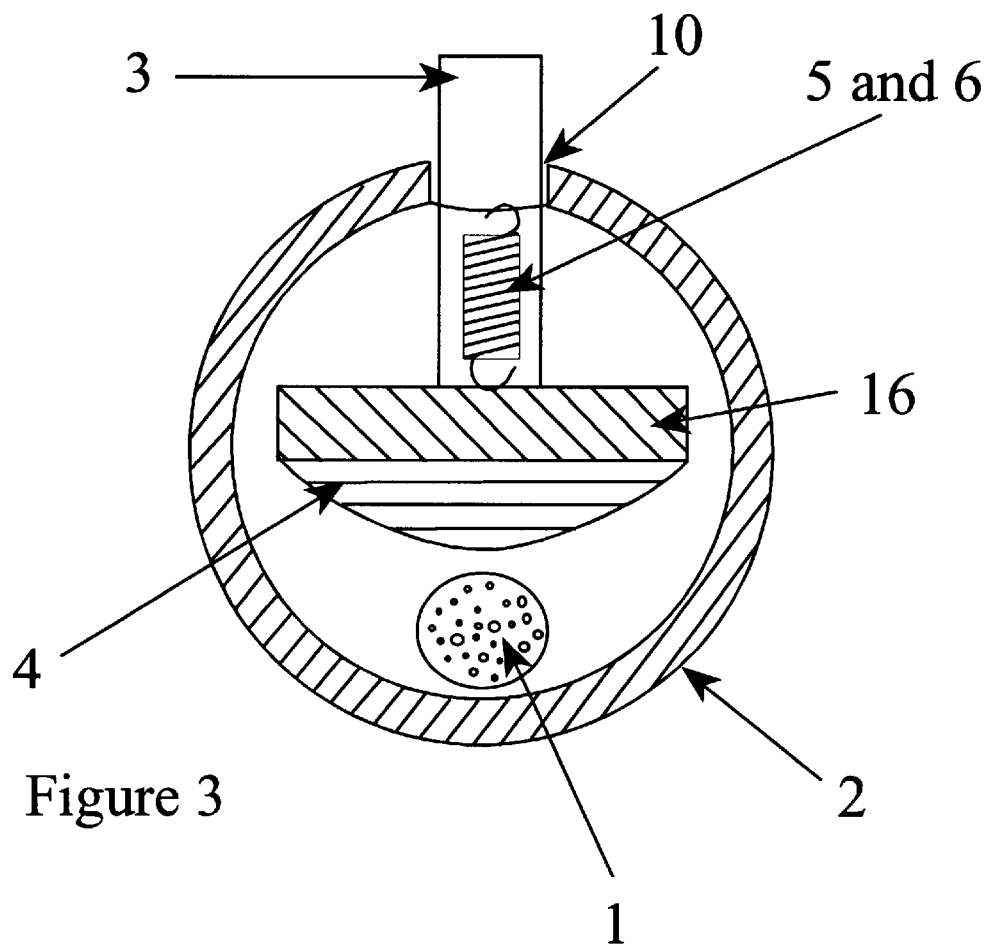
FIG. 3 displays a horizontal cross section of the grip's internal parts.
Figure 4:
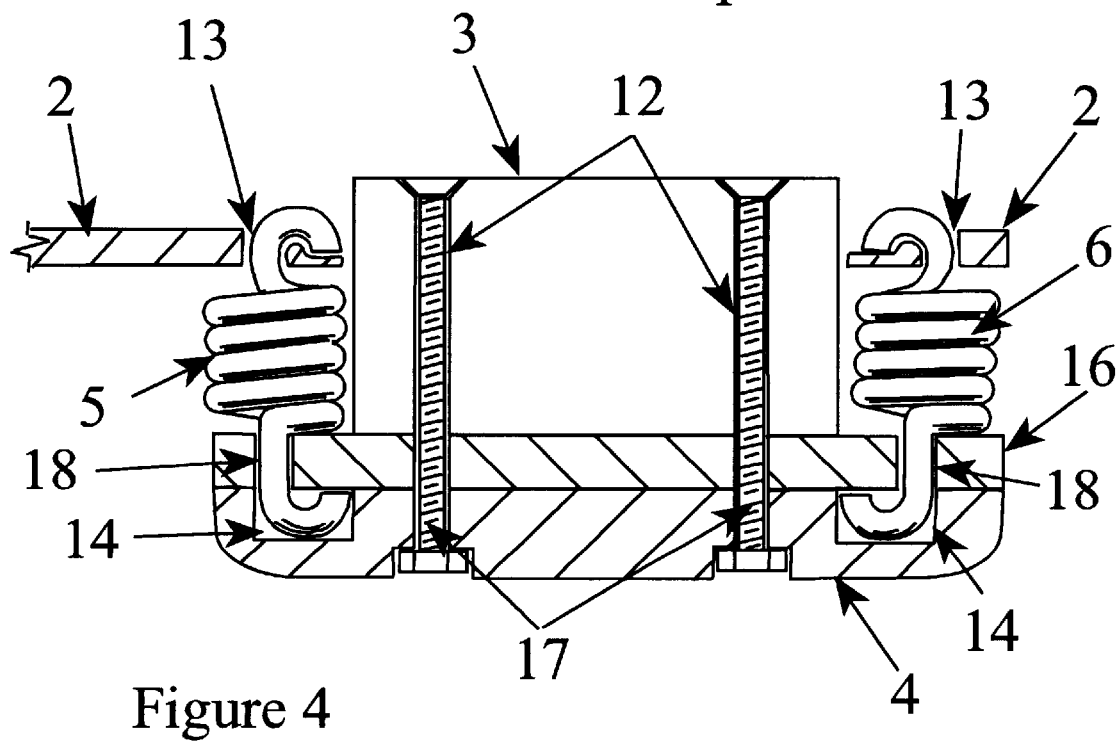
FIG. 4 is a longitude sectional of the brake assembly with attached mechanisms.

Except for the springs, nuts, and bolts which are made of steel, the entire assembly is make from plastic, but, could be assembled from turned metal tubing and bar stock steel. FIG. 1 illustrates the handle in relation to a typical pruning device and shows the location of the handle on the rope being in a horizontal plane. This allows the user to exert lateral tension to activate the cutting blade on the pruner with a maximum of ease. FIG. 2 shows the handle in a neutral position so as to transverse the rope freely. FIG. 3 is a cross sectional view of the handle looking from the tubular end displaying the internal compound mechanism comprising the lever, spacer block, ½ round rope grip and springs. FIG. 4 is a sectional view of the compound lever, spacer block, and ½ round grip displaying one of the various fastening devices possible in it's assemblage and the spring installation in relation to the compound lever, spacer block and ½ round grip to the body of the handle, both in their longest dimension. FIG. 5 is a longitudinal cross sectional view of handle displaying the multi-directional route of the rope through the handle and it's contiguous relationship to the compound mechanism of the lever, spacer block, ½ round rope brake, and springs. The phantom rope illustrations depict the movement of said rope as the handle is moved from a neutral position to one being locked by manipulative hand and wrist movement by the user. FIG. 6 is a 45 degree perspective view showing the oblong opening in the handle that allows the rope to rotate 90 degrees. In detail, referring to the drawings, Number 1, is any resilient rope like material that will be guided into the round aperture of the elongated tubular handle 2, passing through a channel formed by the outer wall of said handle 2, and a compound mechanism, in part comprising of a ½ round rope grip 4, a spacer block 16, a lever 3, and two springs, 5 and 6. The resilient or rope like material 1, will thence traverse laterally through the longest dimension of the handle 2, to egress at the aperture at the opposed end and thence to its destination of attachment to the pruner 8. A weight 9, is attached to the opposed and free end of the resilient or rope like material 1, to give stability to and prevent flapping by rope material 1. When the pruner pole 7, is extended or contracted and the handle 2, is in a neutral mode, it is allowed to move freely in either direction on the resilient or rope like material 1. Phantom hand illustrations 19 show position of the user's hand and wrist locations when the handle is in both passive and active modes. The handle 2 is formed from a circular, hollow tube make of rigid material. Contained therein is a compound mechanism consisting of a lever 3, spacer block 16, and ½ round grip 4. The compound mechanism is held together by fastening devices 17, as representative of one such method shown herein, through channels 12, that traverse through the lever 3, spacer block 16 and ½ round grip 4. Two extension springs 5 and 6, are attached to the compound mechanism in recesses 14, of the ½ round grip at time of assembly, each passing through an orifice 18, of the spacer block 16, and thence connected through openings 13, on the lever exiting side of the handle. The aforesaid extension springs 5 and 6 suspend the compound assembly in a neutral position away from the resilient or rope like material 1, until pressure is exerted on said compound mechanism through the lever 3, which protrudes from the handle 2, through a congruous opening 10, parallel to the longest dimension of the handle 2. To activate the handle, the user will select a chosen position on the resilient or rope like material 1, and then apply pressure on lever 3, allowing the grip 4, to compress the resilient or rope like material 1, against the opposing wall of the handle 2, thereby locking it in a static position. The user at this time, with a manipulative wrist and hand movement, will turn the handle 2, from a plane parallel with the resilient or rope like material 1, to a lateral position. This will allow the user to exert greater tension on the resilient or rope like material 1, with less physical effort. This manipulation is made possible by the unique oblong opening 15, in alignment with opening 10, and lever 3. The phantom resilient or rope like material illustration 11, depicts the movement from horizontal to vertical of said material when handle 2, is activated from a passive to an active position.

What is claimed is:

1. A hand grip comprising an elongated cylindrical tube compatible to a human hand clasp, a freely moving encased half round elongated brake with an attached lever, spacer block and retaining springs forming a throughway therein, lateral to the longest dimension, having an unique oblong opening on the sidewall of the grip and with an aperture at each end of said grip that will allow various diameters and styles of resilient and tubular rope like material to move freely in either direction though said grip passageway and allowing aforesaid brake to be maintained in a neutral position within said grip, remote from the resilient material by use of aforementioned springs and moveable within said grip laterally so that when appropriate pressure is exerted by the user and in a user selected position at any point on the resilient material by the use of hand pressure on a protuberance of said brake extruding through said grip by way of a congruous opening and without releasing hold on said grip by the user, will advance the brake against aforesaid resilient material and commit the resilient material to an immobile position as long as the user exerts pressure, whereby the user may then with manipulative wrist and arm action, using the unique oblong opening, move the secured end of the resilient material closer to the center of the grip and therefore the hand and by using a pulling motion crossways to the grip obtain additional lateral tension, in a very short distance, on the resilient material to create a desired reaction to a secured device, a pruner head or similar machines, at the end of the resilient material.

2. A hand grip comprising an elongated cylindrical tube compatible to a human hand clasp, a freely moving encased half round elongated brake with an attached lever, spacer block and retaining springs forming a throughway therein, lateral to the longest dimension, having an unique oblong opening on the sidewall of the grip and with an aperture at each end of said grip that will allow various diameters and styles of resilient and tubular rope like material to move freely in either direction though said grip passageway and allowing aforesaid brake to be maintained in a neutral position within said grip, remote from the resilient material by use of aforementioned springs and moveable within said grip laterally so that when appropriate pressure is exerted by the user and in a user selected position at any point on the resilient material by the use of hand pressure on a protuberance of said brake extruding through said grip by way of a congruous opening and without releasing hold on said grip by the user, will advance the brake against aforesaid resilient material and commit the resilient material to an immobile position as long as the user exerts pressure, whereby the user may with manipulative wrist and arm action activate said resilient material in either direction to a varying distance in relationship to the user, and without relinquishing their grasp and by using a combination of repetitive actions as mentioned before, continue the movement of said resilient material to any distance in relationship to the user.

* * * * *